July 29, 1930. W. J. HANEY Re. 17,753

TAPPER AND PROTECTOR FOR TOE DANCING SHOES

Original Filed Sept. 22, 1927

Inventor

W. J. Haney

By Clarence A. O'Brien

Attorney

Reissued July 29, 1930 Re. 17,753

UNITED STATES PATENT OFFICE

WILLIAM JOHN HANEY, OF NORTH VERNON, INDIANA

TAPPER AND PROTECTOR FOR TOE-DANCING SHOES

Original No. 1,684,442, dated September 18, 1928, Serial No. 221,320, filed September 22, 1927. Application for reissue filed May 17, 1929. Serial No. 363,928.

The present invention relates to a tapper and protector for toe dancing shoes and has for its prime object to provide a device which may be attached to the toe dancing shoes which are usually used on the stage by toe dancers, which will allow the dancer to make loud taps and which will at the same time afford a protection to the shoe.

A still further important object of the invention resides in the provision of an attachment of this nature which is simple in its construction, comparatively inexpensive to manufacture, strong and durable, adjustable, thoroughly efficient and reliable for the purpose intended.

With the above and numerous other objects in view as will appear as the description proceeds, the invention resides in certain novel features of construction, and in the combination and arrangement of parts as will be hereinafter more fully described and claimed.

Figure 1:
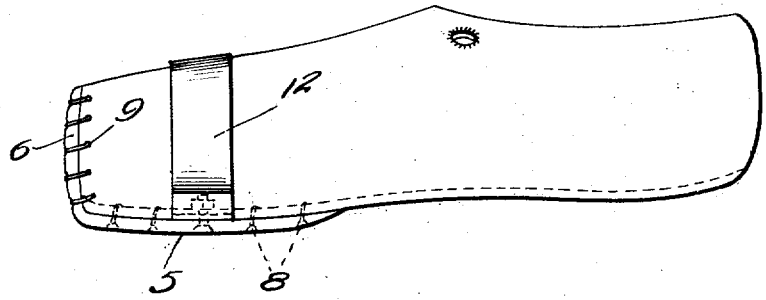
Figure 1 is a side elevation of a toe dancing shoe with my attachment mounted thereon.
Figure 2:
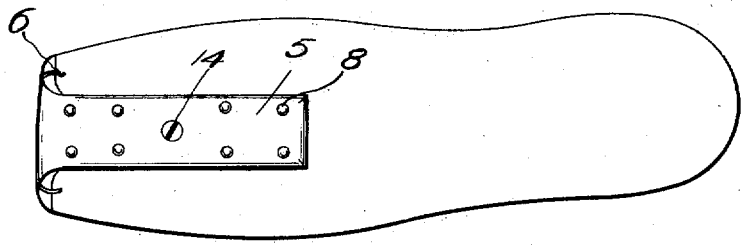
Figure 2 is a bottom plan view thereof.
Figure 3:
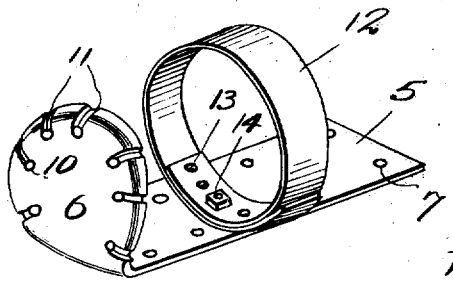
Figure 3 is a perspective view of the attachment per se.

Referring to the drawing in detail it will be seen that the numeral 5 denotes an elongated bottom plate which is slightly curved transversely, the plate 5 is preferably of a substantially rectangular formation and merges at its forward end in a toe plate 6 which is disposed at a substantially right angle to the plate 5 and is thicker. The plate 5 is provided along its longitudinal edges with openings 7 so that nails 8 may be extended therethrough and driven in the sole of the shoe and clinched inside of the sole as is clearly illustrated in Figure 1 so as to hold the plate along the median longitudinal dimension of the sole of the shoe adjacent the front end thereof with the plate 6 extending upwardly in front of the toe portion which is so much used by the toe dancer. This toe plate 6 is threaded to the shoe by means of stitching 9 and with this end in view the curved edge of the plate 6 is provided with a plurality of openings 10 having channels 11 leading outwardly therefrom over the edge of the plate 6. A band 12 of the split type has overlapping ends with apertures 13 and a bolt 14 is adapted to extend through two of these registering apertures and through the plate 5 intermediate the ends thereof so that this band may extend about the toe portion of the shoe as is clearly illustrated in Figure 1. The purpose of having the adjustable band is so that the attachment may be used with different size shoes.

With this attachment on toe dancing shoes it will be seen that the toe dancer may make taps and the like both while standing on the toes and while standing flat-footed, so that both styles of dancing may be performed with loud tapping and it will also be apparent that the device functions as a protection for the shoes.

It is thought that the construction, utility and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and above description.

It will be apparent that changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:

1. An attachment of the class described comprising an enlongated plate slightly curved transversely and merging at one end in a right angularly extending toe plate, a split band having overlapping apertured ends and a bolt to extend through the apertures and through the elongated plate to secure the band thereto in different adjustments for fitting different size shoes.

2. In combination, a toe dancing shoe, an attachment therefor comprising a bottom plate, said bottom plate being transversely curved and merging at one end into a toe plate right angularly disposed in front of the toe portion of the shoe, stitching for securing the toe plate to the shoe and nails for securing the bottom plate to the shoe.

3. An attachment of the class described comprising an elongated plate merging at one end into a right angularly extending toe plate, a band fixed to the elongated plate intermediate its ends for engaging the attachment on a shoe.

4. A tapper having a bottom portion adapted to be opposed to the underside of the sole of the shoe and also having a toe portion disposed at an angle to and integral with the bottom portion and having an exposed edge extending from one side edge of the bottom portion to the other side edge thereof and also having apertures adjacent to said edge, and grooves in its forward side extending from said apertures to its edge.

In testimony whereof, I have affixed by signature.

WILLIAM JOHN HANEY.